March 21, 1950 W. M. BACON 2,501,592
INTERCOMMUNICATING TELETYPEWRITER SYSTEM
Filed July 26, 1946
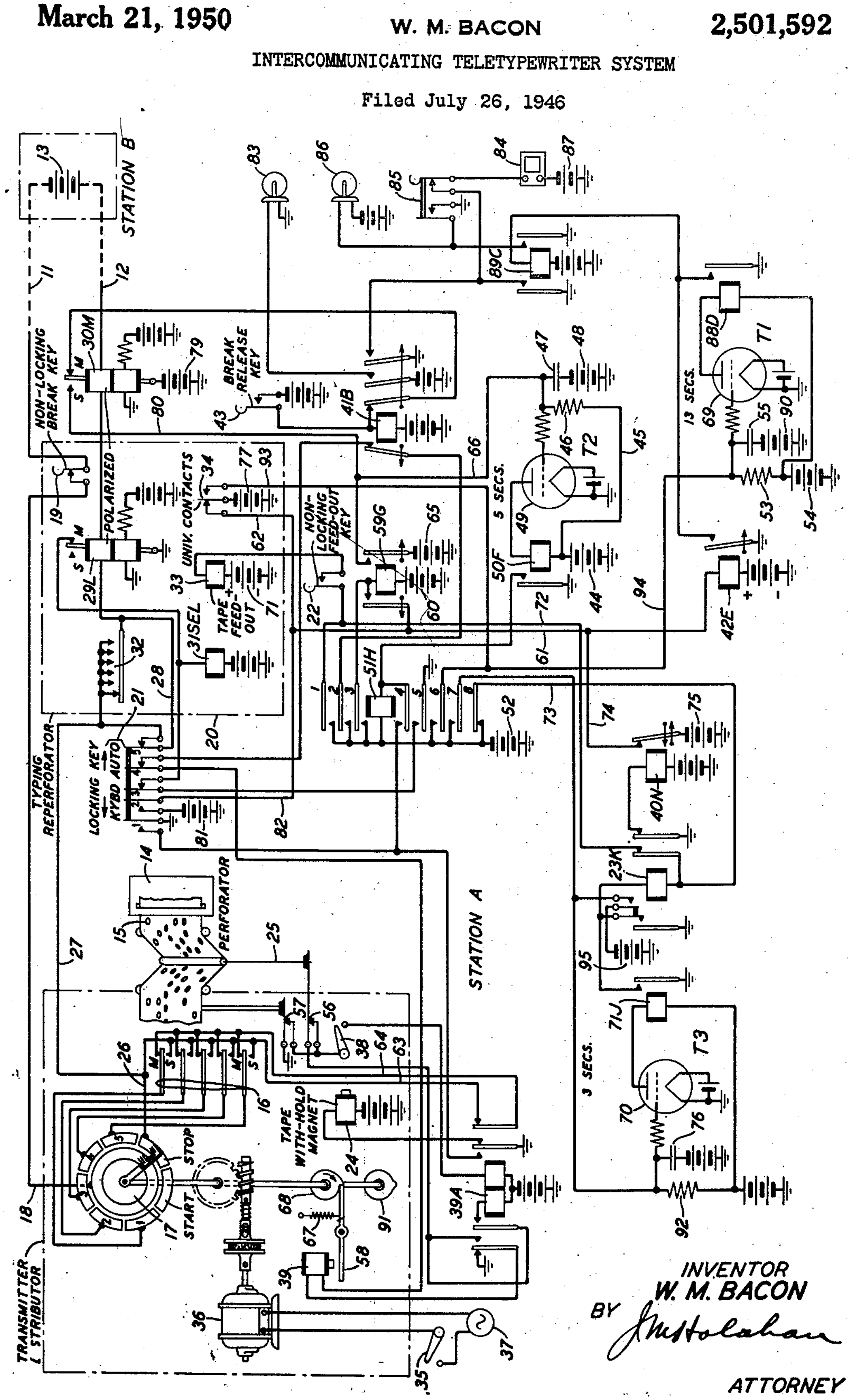
INVENTOR
W. M. BACON
BY [signature]
ATTORNEY Patented Mar. 21, 1950

2,501,592

UNITED STATES PATENT OFFICE 2,501,592

INTERCOMMUNICATING TELETYPEWRITER SYSTEM

Walter M. Bacon, New York, N. Y., assignor to Bell Telephone Laboratories, Incorporated, New York, N. Y., a corporation of New York Application July 26, 1946, Serial No. 686,290

23 Claims. (Cl. 178—3)

This invention relates to permutation code start-stop telegraph intercommunicating systems of the type known as half-duplex in which transmission may be accomplished in one direction at a time over a line or channel of transmission but not in both directions simultaneously; more particularly, the invention relates to such systems in which automatic transmitters, for example, tape-controlled transmitter-distributor sets, are or may be utilized for transmission and supplied with message material from time to time by means of a keyboard perforator or a reperforator controlled by another incoming telegraph line, or a perforator using spliced perforated tape or manually operated means.

In an exemplary embodiment there are assumed to be two substations connected to a line or channel of transmission, each of which transmits its message material to the other and each of which is provided with an automatic transmitter and a receiving recorder which may consist of a printing reperforator or teletypewriter for recording incoming messages.

In half-duplex communication systems in which transmission is controlled by a keyboard-operated transmitter acting directly upon the line, interference caused by an attempt to transmit from both ends of the line simultaneously is recognized by the operators because of the mutilated local copy or by the use of a break signal which locks up the transmitting keyboard and renders it temporarily ineffective to transmit. The operators, in such cases, by prearrangement or otherwise, retransmit the mutilated characters or parts of the message and also, by prearrangement, one or the other of them permits his or her keyboard to remain quiescent when the distant operator resumes transmission.

In a system in which automatic or tape-controlled transmitters are employed, it may happen that both transmitters may begin to transmit simultaneously or one may begin to transmit when the other is already transmitting, with consequent continued garbling of the messages or in some cases one transmitter may transmit a complete message during such time as the other transmitter is also transmitting with consequent complete loss of the message which fact may not be recognized by the attendant with the result that the message is completely lost or its absence may be recognized only after a time with resultant delay and confusion. The loss of messages is especially true in systems wherein local, or home, copy recording is purposefully avoided.

In accordance with the present invention, means are provided whereby an attempt at simultaneous transmission from two ends of the system utilizing automatic or tape-controlled transmitters is avoided by alternately allotting to the two ends of the system, when neither end is transmitting a message, short intervals of opportunity to begin transmitting, and by preventing the initiation of message transmission from either end except at the conclusion of a predetermined interval following cessation of transmission at the other end of the system.

Heretofore in teletypewriter systems comprising reperforators for recording messages, various tape feed-out methods were employed for automatically feeding-out tape from the reperforator after a message is received. When it is desired to transmit the end of the last message perforated, the tape must be spaced or fed out of the reperforator in order to insure that all the message signals previously recorded in the tape will be properly advanced through a transmitter connected to a line outgoing to a receiving printer at another point or station. Various tape feed-out arrangements are disclosed in my (joint with another) copending application, Serial No. 248,426, filed December 30, 1938, and my copending application Serial No. 371,521, filed December 24, 1940, which are now, respectively, Patents 2,495,682 and 2,495,683, granted January 31, 1950.

In my Patent 2,392,356, granted January 8, 1946, and said application Serial No. 371,521, filed December 24, 1940 (copending herewith), I disclose a tape feed withhold mechanism hereinafter referred to; this mechanism with different control circuits than shown in the prior disclosures referred to is employed in connection with the present invention to facilitate the objects thereof and, in particular, to allow check signals to be transmitted from and under control of a tape transmitter and its associated distributor—the tape transmitter being supplied or suppliable at times with a continuous loop of tape—without tearing the tape or interfering with the taut tape control. To this end the tape feed withhold mechanism is conventionally illustrated as a magnet which, when operated, permits one or successive revolutions of the distributor without advancing the tape.

The tape to the tape transmitter may be supplied in sections of one message per section but, in order to realize the full possibilities of the invention, a continuous tape supplied by a perforator (or reperforator) may be assumed and is disclosed. This perforator may be supplied with a known type of tape feed-out mechanism (to be sharply discriminated from the tape feed of the transmitter) such, for example, as is disclosed in Anspach Patent 2,360,637, issued October 17, 1944, wherein provision for feeding out tape at a reperforator is had by manually-operated control means at the reperforator, which control means consists of a latch release button arranged to be operated to an off-normal position after a complete message is received, whereby a rotatable shaft starts operating to perforate the tape with a series of "letters" signals and this perforation of "letters" signals continues until a key at the local station or at a remote station is operated or signals from another message are received in the reperforator, at which time the perforation of "letters" signals stops and the perforations corresponding to the signals of the new message are recorded in the tape or its equivalent as disclosed in my Patent 2,364,417, granted December 5, 1944.

The transmitter tape feed and the tape feed-out of the perforator or reperforator which supplies it are in turn to be distinguished from the tape feed-out mechanism and control devices therefor of a receiving reperforator which receives messages from the incoming line.

An object of the invention is to provide half-duplex teletypewriter service with circuit assurance, automatic transmitter checking and control and non-interfering tape feed-out where two stations are interconnected for communication purposes in a half-duplex telegraph system.

A feature of the invention is the provision at each station of means operative during the idle intervals, that is, intervals occurring between message transmission periods, for transmitting over the line circuit, first in one direction and then in the other, such as every five seconds, a "letters" signal to test the continuity of the line circuit whereby circuit assurance is had.

Another feature is the provision of means at each station for effecting the operation of feeding out tape from the receiving reperforator without interfering with the signals incoming over the line circuit, the operation of such means being manually initiated and then automatically stopped before the other station is afforded the opportunity to transmit.

Another feature is the provision of automatic control in which the transmitter at each station, in turn, is automatically conditioned for transmission and in which the two stations cannot send simultaneously.

Another feature is the provision of alarm circuits for indicating when (1) a "break" signal is received; (2) an open line condition having the duration of at least two character signals, occurs, and (3) a closed line circuit condition having a duration greater than the timing period of the two stations, occurs or power failure and trouble occur in the receivers at either or both stations.

This invention will be better understood from the following detailed description of an exemplary embodiment when read in connection with the accompanying drawing wherein the single figure represents an intercommunicating teletypewriter system designed for half-duplex operation between two or more interconnected stations.

GENERAL DESCRIPTION

Referring to the drawing, the equipment at station A is shown in detail and that of station B is represented in diagrammatic form. Stations A and B are interconnected by line conductors 11 and 12 which form the line circuit normally energized by power source 13 at station B, otherwise the equipments at stations A and B are identical.

Station A comprises (1) keyboard perforator 14 for perforating tape 15, an automatic tape transmitter 16 for translating outgoing message signal combinations on perforated tape 15 into coded signal current combinations for transmission over the segments of start-stop rotary distributor 17 to conductor 18 which is connected through the normally closed contacts of break key 19 to line conductor 11 which as hereinbefore stated forms part of the normally closed line circuit extending to station B, a typing reperforator 20, the keyboard transmitter of which may be substituted at any time, by means of switch 21, for automatic tape transmitter 16 to transmit coded signal current combinations to conductor 18; (2) timing circuit T—1 designed to operate when its charging path remains electrically active for a period of thirteen seconds, visual and audible alarms to indicate that the line circuit is accidentally opened or maintained closed accidentally or grounded or that there is power or machine trouble at the station; (3) timing circuit T2 designed to operate when its charging path remains electrically active for each five-second interval during the idle periods of the line circuit to cause to be transmitted to the line circuit a "letters" signal as a test for the continuity of the line circuit, a single "letters" signal being automatically transmitted at the termination of a five-second interval from one station, say station A, and then, at the termination of a five-second interval from the other station, say station B, this operation being repeated for the duration of each idle period in transmission over the line circuit; and (4) timing circuit T3 designed to operate when its charging path becomes electrically active for three seconds to automatically stop the feed-out of tape through typing reperforator 20 if the feed-out operation has been initiated by manual operation of non-locking tape feed-out key 22 before or during the three-second interval, and if the feed-out operation is still in progress.

Tape transmitter 16 and rotary distributor 17 constitute machine transmission means similar to that shown in detail in United States Patents 2,055,567 and 2,262,014, respectively granted to E. F. Watson on September 29, 1936, and W. Y. Lang on November 11, 1941. Typing reperforator 20 may be of the type disclosed in United States Patent 2,308,554 granted to C. W. Swan on January 19, 1943. Reperforator 20 is equipped with a tape feed-out mechanism represented by magnet 33 and a description of the operation of a tape feed-out mechanism may be had by reference to my joint copending application (Figs. 10, 11 and 20) Serial No. 248,426, filed December 30, 1938. Tape perforator 14 may also be of a typing reperforator arranged to receive from another incoming line or it may be a keyboard perforator of any well-known type and supplied preferably with tape feed-out mechanisms of the Bacon or Anspach type mentioned above.

The transmitter distributor is provided with the usual tape feed mechanism such as shown in Watson Patent 2,055,567, supra, and tape feed withhold mechanism such as shown in Fig. 6 of the Bacon Patent 2,392,356, supra, and operated and controlled by tape feed withhold magnet 24. The form of tape feed mechanism shown in the Bacon patent comprises a pawl and ratchet operated mechanically on each revolution of the distributor 17 after the sensing pins have been withdrawn from the tape to advance the tape to bring forward a new code combination for sensing. The tape feed withhold magnet when energized operates and lifts the pawl from the ratchet so that the pawl operates idly. An exemplary tape feed withhold mechanism is illustrated in Fig. 6 of my Patent 2,392,356, dated June 8, 1946, referred to above, in which cam 674 corresponds to cam 91 of the present disclosure, and magnet 671 corresponds to magnet 24 of the present disclosure, and in which the tape advancing pawl 641, ratchet 640 and armature 643 (not illustrated herein) are fully disclosed.

Perforated tape 15 may be fed from a keyboard-operated perforator 14 or from a reperforator (not shown) operated under control of a line circuit (not shown) incoming at station A or it may be supplied manually with pieces of tape spliced together and perforated with messages to be transmitted. Usually, however, tape 15 will extend from a perforator or a reperforator directly to the sensing head of the tape transmitter 16 and the tape-stop arm 25 will stop the transmitter-distributor when the tape becomes taut due to the cessation of perforator 14. A transmitter-distributor at each of stations A and B may be considered to signify any type of machine transmitter including those which have mechanical distributors as well as those which have segmental distributors.

Distributor 17 in its idle condition, connects the normally energized line circuit over conductor 18 to a circuit extending over its inner ring, brushes at its stop segment, as shown, conductors 26 and 27, contact and spring No. 5 of transmitter switch 21, conductor 28, through the upper windings, in series, of line relay 29L and monitor relay 30—M over the line circuit to station B. Relays 29L and 30—M are of the polarized type and are normally held in their marking positions by the current normally flowing through the line circuit and their upper windings. Each of relays 29L and 30—M is provided with a biasing winding which is normally energized sufficiently to operate the relay to its spacing position when the line circuit is opened. Relay 29L in its marking position normally holds printer selector magnet 31—SEL operated when no messages are being transmitted.

Transmitter key 21 is of the locking type and is arranged to be operated to either of two positions, one when the system is to employ the automatic tape transmitter 16 and the other when the keyboard transmitter 32 is used for transmitting signals to the line circuit. Keyboard transmitter 32 constitutes part of the typing reperforator 20 together with line relay 29L, break key 19, printer selector magnet 31—SEL, tape feed-out magnet 33 and universal contacts 34 which are shown in their normally open position, although closed at an auxiliary contact for a reason hereinafter described.

The equipment at each station shows numerous sources of potential for operating their respective circuits and these sources indicated by two or three battery cells are shown operatively connected to the system except where manually operated switches are provided for establishing such operative connections. When motor switch 35 which is of the locking type is closed, motor 36 starts operating due to alternating current received from source 37. When manually operated switch 38, which is also of the locking type, is operated, the circuit of relay 39A is prepared but is not completed until tape is inserted in transmitter 16, as will be described hereinafter. Relay 39A, in its unoperated position, provides a shunt path for the sensing pins of automatic tape transmitter 16 and furnishes a ground connection for operating start magnet 39 when "letters" test signals are transmitted during the idle periods of the system. Relays 40—N, 41—B and 42E are normally operated. The filament circuit of each of the timing circuits T—1, T—2 and T—3 is shown as normally energized. It is obvious that in addition to switches 35 and 38 a power switch may be provided, in practice, for instantaneously connecting a common source of power through one or more bus bars to each of the operating circuits shown in station A.

For the purpose of illustration, it will be hereinafter assumed that station A is the control station, not because its equipment, in so far as herein disclosed, differs significantly from that of station B, but merely because it is authorized to take the initiative relative to the start of each day's message transmission, and it will also be assumed that station A is sending and station B is receiving. The receiving equipment shown at station A will be construed, when station B is receiving, as being at station B, and therefore only that equipment which is shown at station A will be referred to herein in the description of transmission from station A to station B, under the method of operation. The system functions on the basis of automatically sending over the line circuit a "letters" signal, first from station A and then from station B, about every five seconds, if the interconnecting line circuit is idle. If neither regular messages nor the "letters" signals actuate one of the receiving mechanisms for a period of about thirteen seconds an alarm is brought in. If there are messages to be transmitted they will be sent instead of the "letters" signals. It is understood that it is at the control station A that the daily message transmission started so as to avoid simultaneous transmission from both stations at the beginning of a period of operation, as hereinbefore stated, and that station B, before attempting message transmission, awaits reception of some message, whether significant or perfunctory in the event that station A has no significant message with which to begin the day's operation.

METHOD OF OPERATION

*Transmission of test signal from station A*

When the system is in its idle condition a "letters" signal is first transmitted from station A to station B and then from station B to station A, in turn, over the line circuit comprising conductors 11 and 12, at given intervals, say five seconds, to give the operator at each end of the system assurance that the interconnecting line circuit is in operative condition.

At the start of a day's business the system is placed under the control of one of the stations, say station A. It is assumed that the power for switching operations and supervision is furnished from a local source for operating the equipment at each of the interconnecting stations and that at both stations the apparatus is in identical positions. For example, at station A switches 35 and 38 are in their alternate, or operated, positions, switch 21 is in the position shown, that is, arranged for automatic tape transmission, sixth pin contacts 57 are open because of no perforated tape being in transmitter 16, and that all relays are in the positions in which they are respectively shown. It is further assumed that an operator at station B has placed that station in like condition, that at both stations, the break release key has been operated to clear out a break signal alarm indication which may have resulted from the shut-down condition of the system, that the operator at station A has transmitted a message, whether significant or perfunctory, whereby the operator at station B is apprised of the fact that the system is in full operation, and that neither of the stations has, at the moment, any message to transmit. Accordingly, the system will be in one of its idle periods in that there are no messages to transmit at either station. Break relay 41—B operates upon the momentary operation of the break release key, and is normally held in a locked position over a circuit traceable from grounded positive battery, through the winding and the innermost right-hand armature of relay 41—B, marking contact and armature of relay 30—M to grounded negative battery 79. Immediately timing circuits T—1, T2 and T3 start timing. Timing circuit T3 times out first, that is, becomes conductive, say in three seconds and relays 71J and 23K operate in turn. Relay 23K, upon operating, locks in an operated position and closes at its auxiliary contacts a circuit for connecting grounded negative battery 95 for discharging condenser 76 to thereby restore timing circuit T3 to normal. Relay 23K remains in a locked operated position until relay 51—H operates at the expiration of the five-second interval of timing circuit T2. During this time relay 40—N has released because relay 23 K has operated. The release of relay 40—N is without immediate function at this time because slow-to-release relay 42E which is controlled over one of its operating paths by relay 40—N is now maintained operated over the other of its operating paths extending to grounded negative battery 77 connected to universal contacts 34 in their normal position. Timing circuit T2 becomes electrically active, that is, starts timing, in a circuit traceable from grounded positive battery 44, conductor 45, resistor 46, condenser 47, to grounded negative battery 48, and at the end of five seconds condenser 47 accumulates sufficient charge to cause vacuum tube 49 to pass current for operating relay 50—F. Timing circuit T—1, which is arranged to time out in thirteen seconds, will also start to time its required interval but will cease its timing shortly after a five-seconds interval, or, in other words, as soon as relay 51—H operates, as will now be described.

Relay 50—F, upon operating after five seconds, will close an obvious operating circuit for relay 51—H which operates to close a discharge circuit for condenser 55 of timing circuit T—1; the discharge circuit is traceable from grounded negative battery 52, over the contact and No. 6 armature of relay 51—H, conductor 94, condenser 55, to grounded negative battery 90, and condenser 55 of timing circuit T—1 discharges. Relay 51—H, upon operating, performs several other functions, namely (1) opens at its No. 8 armature and contact the locking circuit for relay 23K which now releases to remove grounded negative battery 95 from the grid of vacuum tube 70, but timing circuit T3 is restrained from starting its timing operation because grounded negative battery 52 now becomes connected to the grid of vacuum tube 70 over armature No. 7 and front contact of operated relay 51—H; (2) closes at its No. 5 armature and contact a circuit connecting ground, over spring No. 3 and the associated contact on switch 21, through the winding of printer selector magnet 31—SEL, to grounded negative battery and the magnet which is normally operated is now held operated so that it will not respond at this time to signals repeated by line relay 29L, that is, when the transmitter 16 at station A is preparing to transmit a "letters" test signal; (3) closes at its No. 2 armature and contact a circuit traceable from grounded negative battery 52, its contact and No. 2 armature, left-hand armature and front contact of relay 41—B, contact in engagement with spring No. 4 of switch 21, through the winding of distributor start magnet 39, outer right-hand armature and back contact of relay 39A, to ground to operate, practically momentarily, start magnet 39 whereby pivoted armature 58 is attracted by start magnet 39 to permit the distributor brushes to start rotating through one revolution; (4) closes at its No. 3 armature and contact a circuit traceable from grounded negative battery 52, its contact and No. 3 armature, through the winding of relay 59G, to grounded positive battery 60 and relay 59G, which is of a type that is slightly slow to release, operates and locks in parallel paths, one traceable over its left-hand armature and front contact, conductors 61 and 62, the left-hand, or normally closed, contact of universal contacts 34, to grounded negative battery 77, and the other traceable over its left-hand armature and front contact, conductors 61 and 74, contact and right-hand armature of relay 40—N, now reoperated because relay 23K has been released, to grounded negative battery 75; and (5) prepares at its No. 1 aramature and contact a circuit for operating tape feed-out magnet 33, should non-locking tape feed-out key 22 be operated at this time, to automatically advance the tape in reperforator 20 in a series of steps.

Since no messages are being transmitted at this time, there is no tape such as perforated tape 15 passing over the sensing pins of tape transmitter 16 and the marking and spacing contacts of the transmitter are shunted by conductors 63 and 64 which at this time are interconnected at the outer right-hand armature and back contact of relay 39A. Consequently, with no tape in transmitter 16 a "letters" test signal is transmitted to station B over the line circuit during the time that the brushes of distributor 17 are rotating through one revolution.

Relay 59G, upon operating, closes at is right-hand armature and front contact a circuit traceable from grounded negative battery 65, right-hand armature and contact of relay 59G, conductor 66, condenser 47, to grounded negative battery 48 to discharge condenser 47 and thereby restore timing circuit T2 to normal. Timing circuit T2, upon being restored to normal, releases relay 50—F which, upon releasing, releases relay 51—H. Relay 51—H, upon releasing, opens the operating circuit for start magnet 39 which releases the armature under the influence of coil spring 67 to engage cam 68 when the distributor brushes complete their revolution. Therefore the brushes of distributor 17 come to a stop after each single revolution during which a test "letters" signal is transmitted. Relay 51—H, upon releasing, removes at the time the holding circuit for printer selector magnet 31—SEL of typing reperforator 20 so that the magnet is now prepared to respond to signals that may be incoming from the line circuit at the end of the next five-second interval and repeated by line relay 29L. The release of relay 51—H by relay 50—F and consequent removal of the hold on selector magnet 31—SEL occurs after the transmission of the start impulse of the "letters" signal, so that the typing reperforator will not be released for a cycle of operation in response to that signal, all of the significant impulses of which are of marking nature, and universal contacts 34 will not be operated. Also relay 51—H, upon releasing, removes at its Nos. 6 and 7 armatures grounded negative battery 52 from the grids of vacuum tubes 69 and 70 of timing circuits T—1 and T3 respectively, and these timing circuits again begin to time their respective timing intervals.

Relay 59G which was locked in its operated position, as hereinbefore stated, is arranged to release only when universal contacts 34 momentarily operate to their off-normal position and these contacts so operate only in response to a signal incoming from station B at which time relay 40—N is in a released position. In order to prevent relay 59G from releasing when a signal is transmitted from station A, the relay is made slightly slow to release. Relay 59G, although capable of releasing during a momentary opening of the universal contacts 34, is made slightly slow to release in order to prevent the possibility of its releasing at a time when a test signal "letters" is being transmitted to the distant station B at which time relay 40—N is changing from a released to an operated position. Should the printer selector magnet 31—SEL of the typing reperforator 20 respond to the start impulse of a test signal as a result of an exceptionally quick release of relay 51—H to thereby cause universal contacts 34 to operate, relay 59G might release if relay 40—N has not as yet operated. Relay 59G, upon being locked in its operated position, maintains at its right armature and contact grounded negative battery 65 connected in a circuit extended through resistor 46, to grounded positive battery 44 whereby condenser 47 is maintained in a discharged condition to prevent timing circuit T2 (five seconds) from starting its timing-out operation after relay 30—M responds to the start impulse of the test "letters" signal transmitted to station B. When relay 51—H released during ransmission of the test signal "letters" to station B over the line circuit, as hereinbefore stated, timing circuit T3 times-out in three seconds, to operate, in turn, relays 71—J and 23K. Relay 23K again locks in its operated position over its own contacts and remains locked until relay 51—H again operates, after a test signal "letters" is received from station B. The time for which relay 23K is locked operated, after the transmission of test signal from station A and before the other test signal is received from station B, is of more than sufficient duration to permit slow-release relay 40—N to release whereby grounded negative battery 75 at the armature of relay 40—N will be disconnected from the other of the locking circuits of relay 59G and relay 59G will be free to release at the time the universal contacts 34 operates in response to the above-mentioned test signal received from station B.

*Reception of test signal at station A*

About five seconds after the "letters" signal has been transmitted from station A, the distant station B transmits a test "letters" signal to station A. This signal incoming at station A causes reperforator 20 to respond. The operating member of universal contacts 34 operates to its right-hand, or off-normal, position to release relay 59G inasmuch as the other locking circuit controlled by relay 40—N is open at this time, and to stop the timing of timing circuit T—1 inasmuch as grounded negative battery 77 is connected to grounded positive battery 54 whereby the discharge of condenser 55 is effected. Relay 59G, upon releasing, disconnects at its right-hand armature and contact, grounded negative battery 65 from grounded positive battery 44 and therefore condenser 47 begins charging to make vacuum tube 49 of timing circuit T2 effective to start the five-second timing interval by means of timing circuit T2. At the end of about five seconds, relay 50—F will again operate, and close at its armature and contact an operating circuit for relay 51—H which also again operates to repeat the cycle. Relay 51—H upon operating, stops the timing of timing circuit T—1 and the operation of timing circuit T3 which has already operated after three seconds of timing.

During periods when the transmitter and distributor 16, 17 are not in use for sending message signals the switch 38 will be open or the contact 57 open. Assuming switch 38 open, which will be the usual situation with a continuous loop of tape, the relay 39A will be released hence the ground to operate the start magnet 39 will be on the left back contact of relay 39A and its battery supply will be over contact 4 of locking key 21; in order that the tape is not advanced or torn relay 39A operates the tape withhold magnet 24 hence no tape feeding occurs on test or check signals transmitted under control of relays 41B and 51H as hereinafter described; moreover, relay 39A at its right back contact short circuits the transmitter selecting contacts and all check signals transmitted are letters; moreover, all such transmission is over the segments of the distributor which tends to verify that the transmitter sensing pins, the distributor segments, brush and driving mechanism therefor are in proper working order.

*Automatic tape transmission*

If, when relay 51—H operates, tape has been placed in transmitter 16, a test "letters" signal will not be sent but the message contained in the tape will be transmitted. When tape is placed in the transmitter 16, it closes the sixth pin contact 57. The transmitter start switch 38 is manually closed and relay 39A operates in the circuit closed by sixth pin contact 57 and switch 38 in its closed position. Relay 39A, upon operating, locks in its operated position by means of the circuit traceable through its inner left-hand contacts, tape-stop contact 56 and sixth pin contact 57, to ground. The switch 38 may then be opened so that should either of contacts 56 or 57 open due to a break in the tape or a taut tape at the end of the message, relay 39A would release. Relay 39A, when it operates, opens at its inner right-hand armature and back contact the operating circuit for tape feed withholding magnet 24 and magnet 24 releases thereby permitting the tape to feed out or step ahead, for each of the signal combinations constituting the message. The operation of relay 39A removes at its right-hand armature and back contact the shunt path around the spacing and marking contacts of the sensing pins of transmitter 16 and prepares a path at its outer left-hand armature and front contact for placing the operation of start magnet 39 under the control of the tape-stop lever 25. If tape-stop switch 38 is closed, the lifting of the tape-stop lever 25, due to taut tape will cause start magnet 39 to release to thereby stop the rotation of the brushes of distributor 17 without releasing relay 39A. If the operator is still preparing perforated tape 15 when the message is being transmitted, she will keep the tape-stop switch 38 closed. If the operator has no further tape to prepare, she will feed out or a known type of tape feed-out mechanism (not shown) will feed out sufficient "letters" signal tape to carry the last part of the message through transmitter 16 and will open the tape-stop switch 38 so that the tape-stop lever 25 or the sixth pin 57 will recognize the end of transmission and thereby cause relay 39A to release. During the operation of relay 39A, that is, when tape is in place in transmitter 16, the relay maintains closed, at its inner right-hand armature and front contact, a locking circuit for relay 51—H.

Assuming that there is perforated tape in transmitter 16 and that the distant station B has stopped sending, after a period of five seconds, timing circuit T2 will again operate relay 50—F which in turn will operate relay 51—H. Relay 51—H locks operated through the inner right-hand armature and front contact of relay 39A, and instead of sending a single "letters" test signal as before, the message on the perforated tape in transmitter 16 will now be transmitted to station B.

When message signals are being received from the distant station B, universal contacts 34, because of these signals, are being repeatedly operated to their alternate position and therefore in response to the first signal of the received message, relay 59G releases. The winding of relay 42E is parallel in the locking circuit for relay 59G, but relay 42E is slower to release than relay 59G, and does not release upon the operation of universal contacts 34 in response to signals being received from station B. Relay 30—M follows the signals of the message received over the line circuit and inasmuch as grounded negative battery 79 is at this time repeatedly connected to a circuit extending over the armature and spacing, or left-hand, contact of relay 30—M, conductors 80 and 66, resistor 46, to grounded positive battery 44, condenser 47 is maintained in a discharged condition and therefore timing circuit T2 is maintained electrically inactive for the duration of the incoming message.

*Tape feed-out operation of reperforator during outgoing message transmission*

It is frequently desirable to feed the end of a message from a reperforator or typing reperforator such as the machine 20; it is desirable especially when this is done under control of the selector to have such operation cease before or upon receipt of another incoming message.

Tape may be fed out of reperforator 20 during the period of transmission from distributor 17 inasmuch as relay 51—H is operated and thereby supplies current from grounded negative battery 52 in a circuit traceable over contact and armature No. 1 of relay 51—H, operated contacts of non-locking feed-out key 22, through the winding of feed-out magnet 33 to grounded positive battery. At the end of the message, relay 39A releases due to either the release of the sixth pin if torn tape is used or the tape-stop lever 25 opening contact 56 if continuous tape is used. Release of relay 39A releases relay 51—H and since outgoing message signals on the line circuit have ceased, the distant station B, after about five seconds, sends either a "letters" signal or a message to station A.

*Tape feed-out operation of reperforator during test signal transmission periods*

Immediately after a test "letters" signal is transmitted from station A the system returns to the same condition as when power was first turned on except that only the timing circuits T—1 and T—3 are timing, that is, they are electrically active. Relay 59G is locked operated and holds timing circuit T—2 inactive. When the system is in this condition, that is, relay 51—H being in a released position, perforated tape may be automatically fed from typing reperforator 20 by closing the non-locking tape feed-out key 22 and holding it operated. Tape feed-out magnet 33 operates in a circuit traceable from grounded positive battery 71, through the winding of feed-out magnet 33, closed contacts of feed-out key 22, conductor 72, back contact and inner right-hand armature of relay 23K, conductor 73, armature No. 8 and contact of relay 51—H to grounded negative battery 52. The operating member of universal contacts 34 momentarily moves to its right-hand, or alternate, position, after each feed-out step of the tape, but slow-release relay 59G does not release at this time because relay 59G is also held locked in a circuit traceable over conductors 61 and 74, front contact and right-hand armature of relay 40—N, to grounded negative battery 75. However, at the expiration of an interval of about three seconds after the release of relay 51—H, condenser 76 accumulates sufficient charge to allow plate current to flow in vacuum tube 70 to operate relay 71—J. Relay 71—J, upon operating, closes an operating circuit for relay 23K, the circuit being traceable from ground at the right-hand armature and contact of relay 71—J, through the winding of relay 23K, to grounded negative battery 52 over armature No. 8 and contact of relay 51—H. Relay 23K operates and locks over its own contact and left-hand armature and remains in its locked condition as long as relay 51—H remains released. Relay 23K, upon operating, opens at its inner right-hand armature and contact, the operating circuit for feed-out magnet 33 which now releases to automatically stop the feed-out of tape at the typing reperforator 20, if it is still in progress. Also relay 23K, upon operating, opens the obvious operating circuit for relay 40—N which, being of the slow-to-release type, releases to open the locking circuit of relay 59G. Relay 59G, however, remains locked, in an operated position, in the circuit traceable to the operating member of universal contacts 34, which has now returned to its normal position. Relay 23K, upon operating, closes at its innermost left-hand front contact, a circuit for discharging condenser 76, and timing circuit T3 therefore restores to normal to effect the release of relay 71—J. Relay 23K remains locked in an operated position, however, through its own contact and the No. 8 armature of relay 51—H which remains in a released position until transmission from station A is resumed.

When relay 51—H released, it permitted timing circuit T—1 to again start timing an interval of thirteen seconds. This timing can only be stopped when the operating member of universal contacts 34 operates to its right-hand, or off-normal, position which it will do in the event that a "letters" or a message signal is received in line relay 29L to operate printer selector magnet 31—SEL. The closure of the operating member of universal contacts to its right-hand, or off-normal, position connects grounded negative battery 77 to grounded positive battery 54 to effect the discharge of condenser 55 in the timing circuit T—1.

*Recapitulation of reception of test signal and subsequent operation at station A*

(1) Check signal is received.

(2) Universal 34 operates to right.

(3) Relay 59G releases. Timing of T1 inhibited.

(4) Timing of T2 initiated.

(5) Five seconds elapse.

(6) Relay 50F operates.

(7) Relay 51H operates and locks over 39A.

(8) Relay 59G operates; relay 23K releases; relay 40N operates.

(9) Alternative condition 1; a message is ready to go out, hence discriminator relay 39A is operated because switch 38 is closed.

(10) Relay 51H is locked operated.

(11) Distributor 17 transmits message; tape advances because magnet 24 is deenergized; pauses in transmission of less than five seconds due to taut tape (38 and 57 being closed) have no effect.

(12) Contact 57 opens or 56 opens with 56 being open.

(13) Relay 39A releases.

(14) Relay 51H releases.

(15) Timer T1 and timer T3 begin to time.

(16) At any time before T3 times out in three seconds feed-out key 22 may be operated to operate magnet 33 to feed out tape from receiving reperforator 20.

(17) Three seconds elapse.

(18) Relay 715 operates; relay 23K operates, relay 40N releases.

(19) Tap feed out by magnet 33 is inhibited; timer T3 is inhibited.

(20) Second alternative condition at (9); no message awaits transmission; relay 39A is deenergized.

(21) Relay 51H operates; timing of T1 inhibited; relay 23K releases; T3 inhibited from timing; 40—N reoperated; 31—SEL locked; relay 59G operates.

(22) Distributor 17 sends one "letters" character; tape does not advance because magnet 24 is operated.

(23) Relay 51H releases.

(24) Timer T1 and timer T3 begin to time; selector magnet 31—SEL is free to respond.

(25) At any time before timer T3 times out in three seconds tape may be fed out.

(26) Three seconds elapse.

(27) Relay 715 and relay 23K operate; relay 40N releases.

(28) Tape feed out by magnet 33 is inhibited; timer T3 is inhibited.

(29) Condition now same as beginning of recapitulation.

(30) Alternative to condition (1); no message or check signal is received: timer T3 times out in thirteen seconds: relay 88 operates; relay 89C operates; alarm 84 sounds.

*Keyboard transmission*

Instead of sending from automatic tape transmitter 16, messages may be sent from the keyboard, that is, the transmitting contacts 32 of typing reperforator 20, by operating the transmitter key 21 to its keyboard, or left-hand, position. Switch 21, upon being operated to its keyboard position, (1) opens at its No. 5 spring and normally closed contacts the shunt previously established around keyboard 32, (2) opens at its No. 4 spring and normally closed contacts the operating circuit for start magnet 39, (3) opens at its No. 3 spring and normally closed contacts the shunt path around printer selector magnet 31—SEL, (4) closes at its No. 2 spring and normally open contacts a locking circuit for relay 59G, the circuit being traceable from grounded negative battery 81, contact and spring No. 2 of switch 21, conductor 82, left-hand armature, front contact and winding of relay 59G, to grounded positive battery 60, (5) closes at its No. 1 spring and normally open contacts a locking path for relay 51—H, the path being traceable from grounded negative battery 52, through the winding and No. 4 armature of relay 51—H, to ground at the No. 1 spring of switch 21. When station A is ready to transmit, the operator may start, the operative condition of the keyboard furnishing the necessary indication that the line circuit is ready to transmit the signals. When the operator wishes to restore the equipment at station A to the automatic tape transmitter operation as a means of sending messages to station B, or to restore the system to its normal condition, key 21 is operated to its right-hand position.

*Alarms*

If a break signal of sufficient duration is received over the line circuit, that is, the circuit becomes opened for a comparatively long interval, relay 30—M remains on its spacing, or left-hand, contact long enough to allow relay 41—B, which is of the slow-release type, to release. Relay 41—B, upon releasing, causes the break and open circuit lamp 83 to light, (2) buzzer 84 to operate and (3) opens the operating path of start magnet 39 to thus preventing attempted transmission over distributor 17. These functions of relay 41—B furnish an indication that there is a break or open circuit condition on the line circuit. Buzzer 84 may be silenced by operating buzzer release key 85, but the operation of the buzzer release key lights the "closed line and machine trouble alarm lamp" 86 as an indication that the key has been operated and the buzzer 84 is silenced. The break indication at station A is released by operating momentarily break-release key 43. The operation of key 43 again operates break relay 41—B and if the line circuit has been restored to normal, relay 41—B will lock operated over the marking contacts of relay 30—M.

If the power at station A fails, relay 41—B will release and bring in the buzzer alarm which operates from a source of current, such as grounded battery 87, which is independent of any local source that is provided for the remaining equipment at station A.

If typing reperforator 20 fails, due to motor or mechanical trouble, universal contacts 34 will not operate and after thirteen seconds timing circuit T—1 will operate relay 88D, the controlling circuit for vacuum tube 69 of timing circuit T—1 being opened at the right-hand contacts of universal contact 34 to permit condenser 55 to accumulate a sufficient charge. Relay 88D, upon operating, closes an operating circuit for relay 89C, and 89C operates to cause lamp 86 to light and buzzer 84 to sound an alarm.

If typing perforator 20 fails in such a manner that universal contacts 34 remain off their normal contacts, thereby preventing timing circuit T—1 from performing its timing operation, relay 42E will release to also cause the operation of relay 89C which brings in the visual alarm in the form of lamp 86 and audible alarm buzzer 84. Relay 42E is made slow-release of the order of 0.20 second, in order to time the off-normal condition of universal contacts 34.

If the automatic tape transmitter-distributor comprising transmitter 16 and distributor 17 fails to send signals, the timing circuit T—1 at the distant station B will time-out and bring in the "closed line or machine trouble alarm" at the distant station B. If the line circuit between stations A and B closes down, timing circuit T—1 at each station will time out and bring in its closed circuit alarm.

What is claimed is:

1. In a telegraph system, a station comprising an automatic transmitter, a channel of transmission, means for initiating transmission from said station to said channel, means for recording signals incoming over said channel, a plurality of timing circuits, each arranged to automatically operate at a predetermined interval of a distinctive duration, one of said circuits having means for maintaining said transmitter quiescent for a predetermined interval of one duration (1) after the system becomes operable, and (2) between the reception of an individual signal or the last signal of a group incoming over said channel, and the transmission of one signal outgoing to said channel, another of said circuits having means for timing a predetermined interval of a lesser duration at the end of a message outgoing over said channel, and still another of said circuits having means for timing a predetermined interval of still another duration whenever said channel or said recording means remains quiescent.

2. In a telegraph station, telegraph impulse transmission means and automatic tape telegraph impulse receiving means in combination with two relays operated by signal impulses outgoing from said transmission means and signal impulses incoming to said receiving means, an alarm circuit, means controlled by one of said relays for operating said receiving means in response to incoming signal impulses, other means controlled by the other of said relays for timing an interval of one duration at regularly recurring intervals to cause said transmission means to transmit an outgoing test signal, and still other means controlled by said one relay for timing an interval of another duration for operating said alarm circuit when said receiving means fails to respond to an incoming signal impulse, and slow-to-release means controlled by said other relay for operating said alarm circuit when said other relay remains in its off-normal position.

3. In a telegraph system, a station including an automatic transmitter including distributor means connected to a line, means for giving said transmitter a condition wherein it is prepared to transmit stored signals over said line and a condition not prepared to transmit a message, a time measuring means, means thereupon operative to await the receipt of a transmitter assignment signal over said line, a discriminator means effective by establishment of said first condition to initiate transmission under control of said stored signals upon receipt of said assignment signal, said discriminator means being effective by establishment of said second condition to initiate measurement of a time by said time measuring means, and interconnections between said time measuring means and said distributor for sending a check signal over said distributor and line under control of the end of said measurement.

4. In a telegraph system, a storage medium controlled transmitter, a channel of telegraphic transmission outgoing therefrom, means for initiating transmission from said transmitter, a time measuring means, means operatively controlled by absence of concurrent transmission from said transmitter to receive and respond to an incoming signal to initiate a time measurement by said time measuring means, a circuit changer operable incident to the end of measurement of said time measurement to initiate transmission via the contacts of said transmitter.

5. In a combination according to claim 4, a discriminator contact operated by absence of message material in the storage of said transmitter-distributor set at the termination of said time measurement to send a check signal over said contacts, and means controlled incident to said transmission to prevent advance of said medium upon said transmission.

6. In a telegraph system, an automatic storage controlled transmitter, means for setting said transmitter in a waiting condition with respect to transmission over an outgoing path of transmission, said path having included therein receiving means, devices operated in response to reception of incoming pulses by said receiving means, a discriminator element operable to condition said transmitter for message transmission, means operable by said discriminator in response to an incoming pulse to initiate transmission, and means whereby said discriminator discriminates between said transmitter being conditioned and not being conditioned whereby upon said transmitter being conditioned it transmits from storage upon initiation of transmission.

7. In combination, a transmitter suppliable with a storage medium under the control of which it transmits message material in the form of codes representing mixed characters and functions over an associated outgoing line by sensing successive codes in said medium, receiving equipment electro-responsively related to said line, stepping means normally operative incident to transmission of each code to advance said medium whereby the next code may be sensed, means operable by said receiving equipment to cause transmission by said transmitter, step inhibiting means, conditioning means for said transmitter, a discriminator controlled by said conditioning means into two conditions, means operated by said discriminator under one of said conditions to cause said transmitter to transmit with normal advance of said medium, and means operated by said discriminator under another of said conditions to cause operation of said step inhibiting means whereby said transmitter transmits without advance of said medium.

8. A channel of impulse transmission having two stations intertransmissably related thereto, each having a machine transmitter capable of impressing impulses upon said channel and means capable of receiving impulses transmitted by said transmitter at the far station in combination with means operable, when neither of said transmitters is impressing message impulses upon said channel to cause said transmitters repeatedly to send test signals back and forth over said channel at frequent intervals, and means operable by failure of a test signal to arrive within a predetermined time to sound an alarm.

9. In a telegraph system, a station comprising an automatic tape transmitter, a channel of transmission, means for initiating transmission from said transmitter, means for recording signals incoming over said channel, holding means for maintaining said recording means unresponsive to signals transmitted to said channel, and operable means controlled by a tape in said transmitter, means controlled by said operable means when unoperated to cause said transmitter to transmit to said channel a test signal at an interval of time after the end of incoming reception of comparatively long duration with respect to the intervals between continuous message signals and means controlled by said operable means when operated to cause said transmitter to transmit message signals to said channel after an interval of similar duration.

10. In a telegraph system, a station comprising a tape transmitter controlled by a message signal storing tape, a transmitter start switch, taut-tape contacts and tape-out contacts, a channel of transmission, operable means controlled by control of said contacts by tape in said transmitter, means including said operable means, when unoperated, to cause said transmitter to respond to cessation of incoming transmission by transmitting to said channel a test signal after an interval of comparatively long duration with respect to the intervals between continuous message signals and means including said operable means, when operated, to cause said transmitter to transmit message signals to said channel, and means controlled by said taut-tape contacts and said tape-out contacts when closed for continuing said transmitter in message signal transmission, when started, independently of the position of said tape-stop switching means so long as a tape supply is available to said transmitter.

11. In a telegraph system, a station comprising a tape transmitter normally controlled by a message signal storing tape, a transmitter start switch for conditioning said transmitter to start under control of said tape, contact means controlled by a tape available to said transmitter, a channel of transmission, operable means controlled by control of said contacts by tape in said transmitter, means including said operable means, when unoperated, to cause said transmitter to respond to cessation of incoming transmission over said channel by transmitting to said channel a test signal after a timed interval, and means including said operable means, when operated, to cause said transmitter to transmit message signals to said channel, and timing means initiated into action by incoming transmission over said channel to determine the duration of said interval.

12. In a telegraph system, a station comprising an automatic tape transmitter, a channel of transmission, a plurality of relay means, means for initiating transmission from said transmitter, means for causing continuation of transmission as long as message material is awaiting transmission, means for indicating a prolonged abnormal line or transmitter condition of said system, each relay means having a signal controlled element arranged to be operated between two positions in response to signals outgoing to and incoming over said channel, means controlled by one of said elements for causing to be recorded signals incoming over said channel, means controlled by the other of said elements in one position only for suppressing outgoing transmission during incoming of signals on said channel, and means controlled by said other element in the other position for suppressing operation of said indicating means.

13. In a telegraph system, a channel of telegraphic communication, a station at each end of said channel, a receiving tape reperforator at each of said stations, means operable at predetermined intervals for allotting to said stations alternately the opportunity to transmit over said channel, means associated with said reperforators for feeding extra tape therefrom, manually operable means for activating said tape feeding means, and means for inhibiting operation of said tape feeding means at either station a predetermined interval before allotment to the other station of the opportunity to transmit.

14. In a telegraph system, a channel of telegraphic communication, a station at each end of said channel, a tape reperforator at each station, means for rendering said reperforators responsive only to signals received over said channel, means for precluding simultaneous transmission by said stations, means associated with said reperforators for feeding extra tape therefrom, manually operable means for activating said tape feeding means, means effective during message transmission from a station for effecting unlimited operation of the tape feeding means thereat, and means for inhibiting operation of said feeding means at a predetermined time after message transmission ceases.

15. A half-duplex transmission telegraph channel having a transmitter associated with each terminus of the channel, means for enabling the transmitter which transmits in a first direction to initiate transmission, a receiving device having local feed-out means for stepping out recording medium connected to said channel to receive messages transmitted in a second direction, means operable incident to and under control of termination of transmission in a first direction to time a period thereafter within which said feed-out means is conditioned for operation and after which it is inhibited, and means operable incident to and under control of said termination of transmission to time a greater period within which said transmitter for transmitting in the second direction is inhibited from transmission and after which it is conditioned for transmission.

16. A telegraph signaling station comprising a storage controlled transmitter, a receiver of the type recording on a medium, a channel of transmission and reception for transmission by said transmitter and reception by said receiver, time measuring means, means operated incident to and under control of transmission by said transmitter to measure a time interval beginning at the end of such transmission, means for feeding recording medium from said receiver independently of reception, circuit establishing elements for enabling such feed-out means to function during the measurement of said time interval, and circuit modifying means for inhibiting such feed-out means from functioning upon completion of measurement of said time interval.

17. A telegraph system comprising a channel of transmission having associated therewith two automatic storage transmitters at geographically separated points, each of said transmitters having a start switch, an automatically operating timing means at each point, means at each of said points operative in response to the operation of its local one of said timing means for controlling the other of said timing means over said channel whereby first one and then the other of said transmitters is given access to said channel upon the completion of one or more messages transmitted successively over said channel when its start switch is closed, means including a discriminator controlled by said start switch whereby said transmitter upon being given access to said channel is caused to send signals under storage control when said start switch is in start position at the instant of said access, and means including said discriminator whereby said transmitter is caused to send a check signal independently of said storage when said start switch is not in start position at the instant of said access.

18. Arrangement as per claim 17 having means whereby after initiation of message signals all available message signals may continue to be transmitted after changing said start switch to stop position.

19. A telegraph system comprising a normally energized line circuit of impulse transmission, reciprocally operating sending and receiving mechanisms at the terminals of said circuit for sending backward and forward over said channel a series of test signals, a main message transmitter at at least one terminal, said sending mechanism at said terminal comprising essential element of the said main message transmitter which operate incident to the test signal sending, means included in said line circuit immediately responsive to a complete test signal incoming over said circuit for conditioning the mechanism receiving the completed test signal to send another complete test signal over said circuit in the opposite direction, and means for automatically repeating said reciprocal operation at regularly recurring intervals.

20. A telegraph system comprising a normally energized line circuit of impulse transmission, reciprocally operating, sending and receiving mechanisms at the terminals of said circuit for sending backward and forward over said channel a series of test signals, a main message transmitter code at at least one terminal, said sending mechanism at said terminal comprising essential elements of said main message transmitter, check signal establishing means whereby said check signal is caused to consist of selecting code elements which are wholly marking in nature, means included in said line circuit immediately responsive to a complete test signal incoming over said circuit for conditioning the mechanism receiving the completed test signal to send another complete test signal over said circuit in the opposite direction, and means for automatically repeating said reciprocal operation at regularly recurring intervals.

21. A telegraph system comprising a normally energized line circuit of impulse transmission, reciprocally operating sending and receiving mechanisms at the terminals of said circuit for sending backward and forward over said channel a series of test signals, a main message transmitter at at least one terminal, said sending mechanism at said terminal comprising essential elements of the said main message transmitter which operate incident to the test signal sending, means included in said line circuit immediately responsive to a complete test signal incoming over said circuit for conditioning the mechanism receiving the completed test signal to send another complete test signal over said circuit in the opposite direction, means for automatically repeating said reciprocal operation at regularly recurring intervals, a storage medium and a start control element for said message transmitter, a discriminator effective under control of said start control element to cause said message transmitter to send signals under control of said medium in lieu of a test signal when said discriminator is in message start condition and said medium is supplying stored signals to said transmitter.

22. A telegraph transmitter of the type having transmitter contacts and sensing elements for sensing in succession code combinations stored in a medium and setting said contacts under control thereof, means including a start controller and contact means controlled by said medium for setting said transmitter into transmission under control of said stored code combinations as successively sensed by said elements, means including relays controlled by said contact means, conductors and contacts for locking a definite code combination upon said sensing elements, and interconnections whereby said means including relays effect said locking under control of exhaustion of available medium.

23. A telegraph transmitter including transmitter contacts and sensing elements for sensing successive code combinations stored in a medium and setting said contacts under control thereof, a channel of transmission, means for setting said transmitter into transmission over said channel under control of said medium, means controlled by said medium incident to temporary termination of transmission under control thereof for locking said contacts into an all-marking condition, and means thereafter controlled by and incident to reception of a pulse or pulses over said channel to cause said transmitter to transmit a code as determined by said locked up contacts.

WALTER M. BACON.

REFERENCES CITED

The following references are of record in the file of this patent:

UNITED STATES PATENTS

| Number | Name | Date |
|---|---|---|
| 1,579,999 | Benjamin | Apr. 6, 1926 |
| 1,677,859 | Dudley | July 17, 1928 |
| 2,160,083 | Peterson | May 30, 1939 |
| 2,360,637 | Anspach | Oct. 17, 1944 |
| 2,439,398 | Praizner | Apr. 13, 1948 |
| 2,465,507 | Bacon | Mar. 29, 1949 |